United States Patent [19]
De Witt et al.

[11] Patent Number: 5,536,288
[45] Date of Patent: Jul. 16, 1996

[54] INTERTIAL FILTER

[76] Inventors: James J. De Witt; Petrus M. Ootsthuizen, both of 58 Wepener Street, Booysens, Johannesburg, Transvaal Province, South Africa

[21] Appl. No.: 376,840

[22] Filed: Jan. 23, 1995

[30] Foreign Application Priority Data

Jan. 25, 1994 [ZA] South Africa ............................ 94/0499

[51] Int. Cl.$^6$ .................................................. B01D 45/00
[52] U.S. Cl. ................................ 55/440; 55/443; 55/464; 55/DIG. 14; 95/272
[58] Field of Search ............................ 55/440, 442, 443, 55/444, 464, DIG. 14; 95/272; 96/189, 204

[56] References Cited

U.S. PATENT DOCUMENTS

| | | | |
|---|---|---|---|
| 981,058 | 1/1911 | Buhring | 55/464 |
| 1,159,073 | 11/1915 | Nies et al. | 55/464 |
| 1,854,340 | 4/1932 | Langvand | 55/444 |
| 2,474,540 | 6/1949 | Marsh | 55/464 |
| 3,849,095 | 11/1974 | Regehr | 55/440 |
| 4,690,701 | 9/1987 | Hedrick et al. | 55/440 |

FOREIGN PATENT DOCUMENTS

| | | | |
|---|---|---|---|
| 2554737 | 5/1985 | France | 55/440 |
| 222778 | 6/1909 | Germany | 55/443 |
| 258180 | 7/1988 | Germany | 55/444 |
| 1674914 | 9/1991 | U.S.S.R. | 55/440 |
| 1681909 | 10/1991 | U.S.S.R. | 55/444 |
| 1692616 | 11/1991 | U.S.S.R. | 55/444 |

*Primary Examiner*—C. Scott Bushey
*Attorney, Agent, or Firm*—Tilton, Fallon, Lungmus & Chestnut

[57] ABSTRACT

This invention relates to an inertial filter which utilizes differential fluid velocity of a fluid flowing through fluid passageways to remove particulate matter entrained in the fluid. The filter has a plurality of baffle plates located within a housing. Each baffle plate has a medial deflector plate from which extends a pair of lateral deflector plates. The plates have flanges and adjacent plates are cooperable in use to form a fluid passageway through the filter. The orientation and configuration of the flanges and plates form at least two areas where fluid flowing between the plates is alternately speeded up and slowed down. As the fluid flows centrifugal force flings particulate matter entrained in this fluid outwardly where it collects on the plates, flows operatively downwardly along the plates, is collected in a channel towards the operative bottom of the filter and is removed.

6 Claims, 1 Drawing Sheet

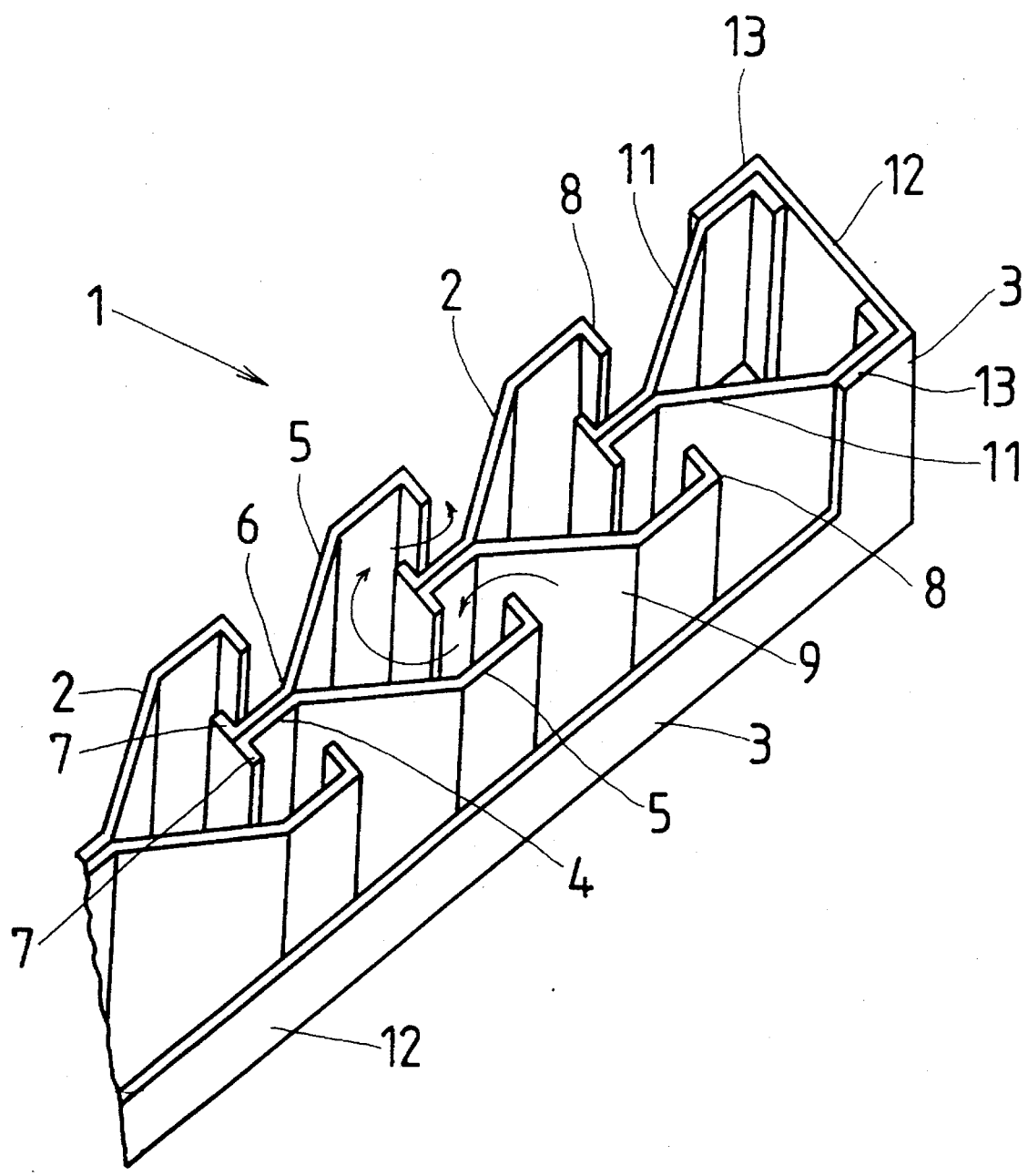

INTERTIAL FILTER

INTRODUCTION

THIS INVENTION relates to an inertial filter primarily for use in extracting matter from fluids.

BACKGROUND TO THE INVENTION

Inertial filters which make use of the inertia of particulate matter in a fluid passing through the filter to separate the particulate matter from the fluid are well known. These types of filters have a series of generally arcuate baffle plates arranged within a housing such that the longitudinal edges of the plates overlap defining a fluid passageway having at least two opposite directed bends per pair of baffle plates.

As a fluid passes through the fluid passageway and negotiates the bends, the fluid velocity at the outer margin of the bend is greater than the fluid velocity at the inner margin of the bend. This difference in velocity coupled with the change in direction of the fluid urges particulate matter in the fluid towards the outer margin of the bend. When the fluid negotiates an oppositely directed bend, the fluid velocity is reduced and the particulate matter is precipitated out and collected, usually in channels towards the bottom edge of the housing, for removal.

In many cases the velocity of fluid at the inner margin of the bend is not sufficiently low to enable small particles like water or fat droplets to precipitate out. This reduces the efficiency of the filter.

OBJECT OF THE INVENTION

It is an object of this invention to provide an inertial filter which at least partly alleviates the above disadvantage.

SUMMARY OF THE INVENTION

In accordance with this invention there is provided an inertial filter comprising a plurality of baffle plates within a housing, each baffle plate having, when viewed in cross section, a medial deflector plate and a pair of lateral deflector plates projecting from a central rachis, the medial deflector plate having a pair of operatively outwardly orientated flanges extending therefrom and each lateral deflector plate having an operatively inwardly orientated flange extending therefrom, the medial deflector plate flanges being cooperable in use with lateral deflector plate flanges of adjacent baffle plates to form a fluid passageway through the filter, said fluid passageway having at least two areas of differential fluid velocity which utilize inertia of particulate matter entrained in fluid flowing through the filter to remove said particulate matter from the fluid.

The invention provides further for each lateral deflector plate to be angled at approximately 135° relative to the medial deflector plate; and for the flanges to be at right angles to the longitudinal filter axis.

There is also provided for each baffle plate to consist of a pair of sub plates affixed to each other, each sub plate forming one half of the width of the medial deflector plate and one lateral deflector plate, the sub plates of each baffle plate being mirror images of each other in cross section.

There is further provided for the operatively lower margins of the baffle plates, alternatively of one of a pair of sub plates, to cooperate with the housing to form a gutter for collection and removal of particulate matter.

The invention extends to a baffle plate for use in an inertial filter as described above and to a sub plate for use in constructing baffle plates as described above.

BRIEF DESCRIPTION OF THE DRAWINGS

A preferred embodiment of the invention will be described below by way of example only, and with reference to the accompanying drawing which is a part sectional isometric view of an inertial filter according to the invention.

DETAILED DESCRIPTION OF THE DRAWING

Referring to the drawing, an inertial filter (1) consists of a plurality of generally vertically orientated baffle plates (2) within a housing (3). Each baffle plate (2), when viewed in transverse cross-section, has a medial deflector plate (4) and a pair of lateral deflector plates (5) projecting from a central rachis (6).

Each medial deflector plate (4) has a pair of operatively outwardly orientated flanges (7) extending therefrom and each lateral deflector plate (5) has an operatively inwardly orientated flange (8) extending therefrom. The lateral deflector plate flanges (8) in a filter (1) are positioned such that they are opposite the rachis (6) of an adjacent baffle plate (2). In this way a fluid passageway (9) is formed between adjacent baffle plates (2).

In the embodiment illustrated the lateral deflector plates (5) are disposed at an angle of 90 to each other and at an angle of 135 to the medial deflector plate (4). The flanges (7 & 8) are at right angles to the longitudinal axis of the filter (1).

Each baffle plate (2) consists of a pair of identical but mirror imaged sub plates (11) affixed to each other at the medial deflector plate (4). In the assembled filter the baffle plates (2) are substantially vertically orientated and the sub plates are vertically staggered so that a continuous channel is formed at the operatively upper and lower ends of the filter.

The housing (3) is formed from a number of channel sections (12) affixed to each other with the flanges (13) of the channels facing inwardly. The baffle plates (2) are located within the channels and are affixed thereto.

In the embodiment illustrated the channel sections (12) and baffle plates are manufactured from aluminium although it will be appreciated that any suitable metal sheets can be used. The elements are spot welded to each other.

In use, as air or any other fluid is drawn through the fluid passageways it is forced to negotiate a bend formed by the flange (8) of a lateral deflector plate and the side of an adjacent lateral deflector plate. In negotiating this bend air towards the outer periphery of the radius of the bend speeds up while air towards the center slows down. This differential causes particulate matter entrained in the fluid to be flung outwardly. Once the first bend has been negotiated the fluid passageway turns in the opposite direction. This reduces the velocity of the fluid which had previously been increased and particulate matter entrained in the fluid precipitates out or collects on the walls of the deflector plates to run down and collect in the gutter at the outermost end of the filter.

It is envisaged that the cross sectional profile and arrangement of the baffle plates will render the inertial filter more efficient at removing particulate matter from a fluid than most conventional inertial filters. In addition the filter is bi-directional.

It will be appreciated that variations can be made to the embodiment of a filter as described above without departing from the scope of the invention. In particular the filter may be manufactured from any suitable sheet material and it may be adapted for either vertical or horizontal operation.

We claim:

1. An inertial filter comprising a plurality of longitudinally aligned baffle plates within a housing, each baffle plate having, when viewed in cross section, a medial deflector plate having a pair of ends and a pair of lateral deflector plates projecting from one end of said medial deflector plate, said medial deflector plate having a pair of operatively outwardly orientated flanges extending from the other end thereof and each lateral deflector plate having a free end and an operatively inwardly orientated flange extending from said free end, said medial deflector plate flanges being, in use, located between the lateral deflector plates of adjacent baffle plates to form a fluid passageway through the filter, said fluid passageway having at least two areas of differential fluid velocity which utilize inertia of particulate matter entrained in fluid flowing through the filter to remove said particulate matter from the fluid.

2. An inertial filter as claimed in claim 1 in which each lateral deflector plate is angled at approximately 135° relative to the medial deflector plate.

3. An inertial filter as claimed in claim 1 in which both said flanges are at right angles to the length of the baffle plates.

4. An inertial filter as claimed in claim 1 in which each baffle plate consists of a pair of sub plates affixed to each other, each sub plate forming one half of the width of the medial deflector plate and one lateral deflector plate, the sub plates of each baffle plate being mirror images of each other in cross section.

5. An inertial filter as claimed in claim 1 in which said housing is provided by channel sectioned members around the baffle plates with the bottom sections providing a collection gutter.

6. An inertial filter as claimed in claim 5 in which at least the lower margins of the subplates are vertically staggered to allow flow along the length of the gutter.

\* \* \* \* \*